UNITED STATES PATENT OFFICE.

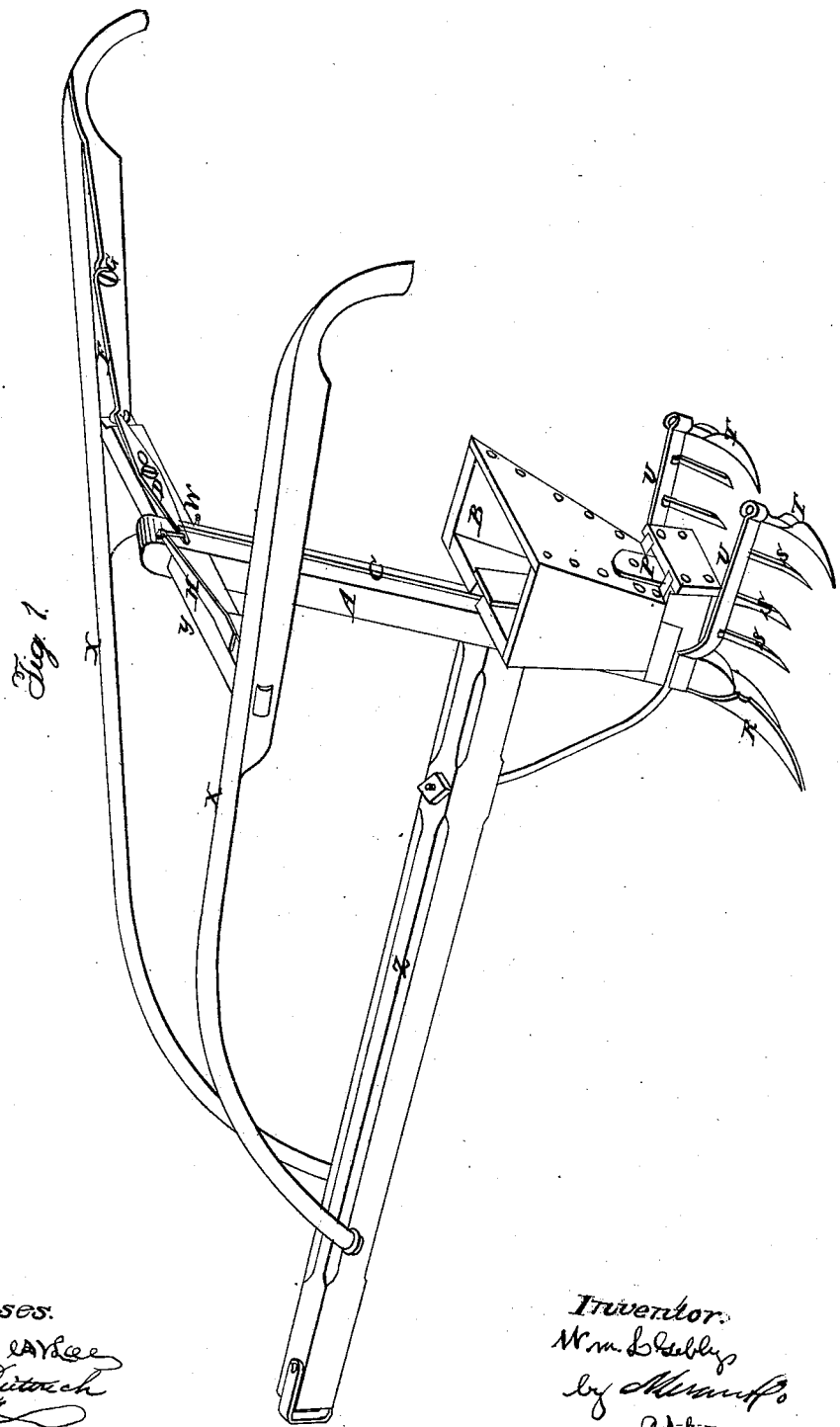

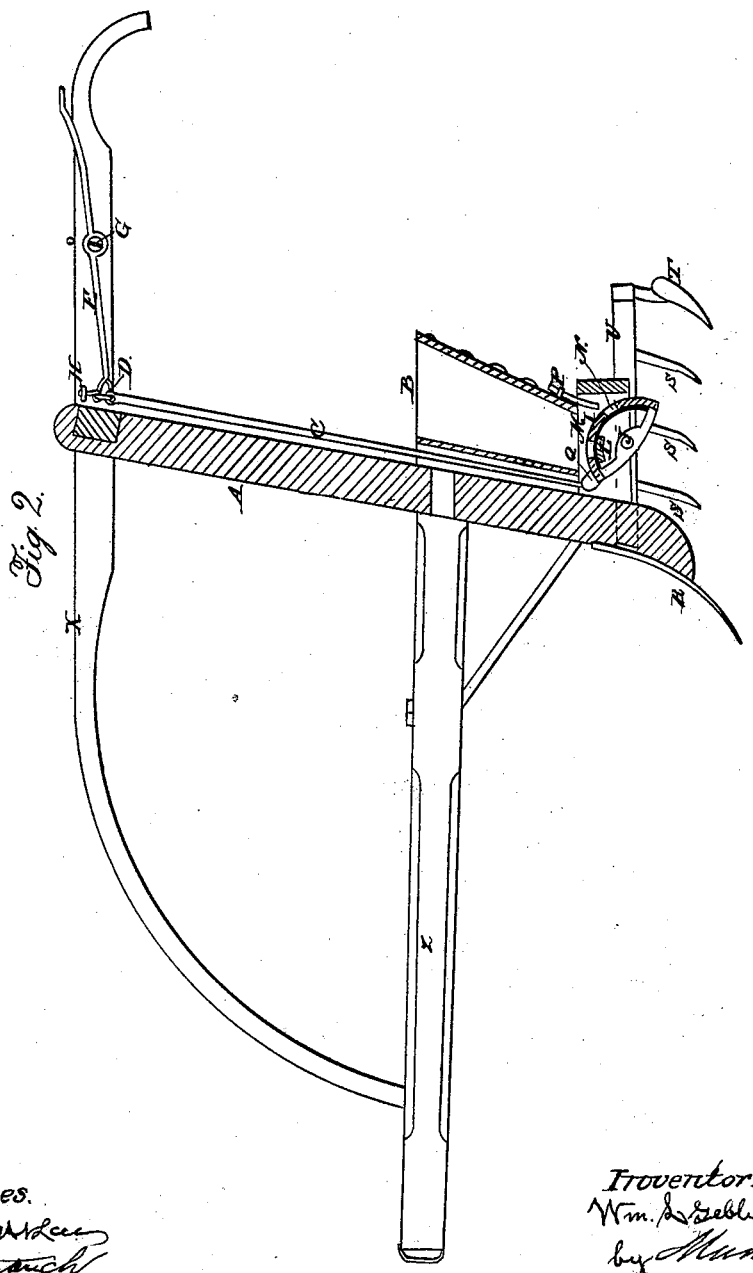

WILLIAM L. GEBBY, OF NEW RICHLAND, OHIO.

IMPROVEMENT IN SEED-PLANTERS.

Specification forming part of Letters Patent No. 29,581, dated August 14, 1860.

*To all whom it may concern:*

Be it known that I, WILLIAM L. GEBBY, of New Richland, in the county of Logan and State of Ohio, have invented a new and useful Improvement in Seed-Planters; and I do hereby declare that the following is a full, clear, and exact description of the same, reference being had to the accompanying drawings, forming a part of this specification, in which—

Figure 1 represents a perspective view, and Fig. 2 a vertical section, of the implement.

Similar letters of reference in each of the several figures indicate corresponding parts.

It consists in the combination and relative arrangement of a plowshare, harrow, coverers, seed-box, semicircular valve, curved bar and connecting-rod, spring, and levers for purposes hereinafter to be described.

To enable others skilled in the art to make and use my invention, I will proceed to describe its construction and operation.

Z is the draft-pole of the implement, A the standard, and X X the handles. The forward ends of the handles are attached to the pole Z. The handles are also secured to a cross-piece, Y, extending from the standard, near their rear ends. The seed-box or hopper B is fastened to the lower part of the standard. The bottom of the box B consists of a valve, I, of semicircular shape, and pivoted in the center at J. Brushes or pieces of leather or other elastic material, P Q, are attached to the bottom edges of the front and back of the seed-box, respectively, so that the semicircular valve can play between the two without allowing any of the seeds to pass out of the box, except through the holes M N in the valve. A stationary bar, L, (the upper surface of which is curved so as to suit the curvature of the valve,) is arranged across the box underneath and in contact with the under surface of the valve. The bar L is arranged between the two valve-holes M N, and is of such a width that during the reciprocating motion of the valve one of the holes will always be above the bar L, while the other hole is beyond the bar, and vice versa. By this means one hole, M, will be filled with the seed while the other hole, N, drops the seed, and vice versa. The upward sweep of the forward end of the valve is confined by the lower edge of the front of the seed-box, and its downward sweep by pin W, (hereinafter to be described,) in such a manner that the valve cannot sweep far enough either way to move hole M behind bar L or hole N forward of bar L. Thus the seed will alternately be dropped at both sides of the bar, and thereby be properly distributed over the ground and the choking of the valve be prevented. The lower end of a connecting-rod, C, is linked to the forward end of the valve, while the upper end of said rod C is hung to the inner end of a lever, D. This lever is pivoted to the cross-piece Y at O, and its outer end is connected to another lever, F, which is pivoted to one of the handles X at G. The rear end of lever F is within reach of the hand of the operator. A spring, H, holds the inner end of lever D down against a pin or stay, W. On depressing the rear end of lever F the tension of the spring can be overcome so as to operate the seed-box valve. A plowshare, R, is attached to the lower end of the standard A, and two horizontal arms, U, extend backward from this end of the standard. These arms are provided with harrow-teeth S, and with coverers T at their rear ends. The plow cuts the furrow for the reception of the seed, and the harrow-teeth and coverers serve to close the furrow over the seed.

What I claim as my invention, and desire to secure by Letters Patent, is—

The combination and relative arrangement of plowshare R, harrow U U S, coverers T T, seed-box B, semicircular valve I, curved bar L, and connecting-rod C, spring H, and levers D F, substantially as and for the purposes set forth.

The above specification of my improvement in seed-planters signed by me this 21st day of June, 1860.

WM. L. GEBBY.

Witnesses:
GOODWIN Y. ATLEE,
R. W. FENWICK.